United States Patent Office 3,050,395
Patented Aug. 21, 1962

3,050,395
DIRECT POSITIVE EMULSIONS CONTAINING N-OXIDES
George Frank Duffin, Ilford, England, assignor to Ilford Limited, Ilford, England, a British company
No Drawing. Filed Jan. 24, 1961, Ser. No. 84,487
Claims priority, application Great Britain Jan. 29, 1960
11 Claims. (Cl. 96—101)

This invention relates to the production of direct positive emulsions.

There has already been described a method of producing a direct positive emulsion in which there is incorporated in a silver chloride emulsion, which is substantially free from silver bromide or silver iodide, a proportion of a desensitising compound and the emulsion is fogged by light or chemical means. When an emulsion so produced is thereafter exposed and developed, a positive image is directly produced.

Desensitising compounds are not, however, universally useful for the purpose, and so far as is known the selection of suitable desensitisers must still be on an empirical basis.

The present invention is based on the discovery of a new class of desensitising compounds which have been found to be of particular value for the said process.

According to the present invention a direct positive photographic material comprises a silver chloride emulsion which has been fogged by light or by chemical means and which includes as a desensitising compound a heterocyclic nitrogen compound containing at least one nitro substituent in the hetero ring, or in a benzene ring fused thereto, and wherein the hetero nitrogen atom, or at least one of them if more than one is present, is in the form of an N-oxide. Suitable heterocyclic compounds are, for example, the nitro derivatives of pyridine, quinoline, isoquinoline, thiazole, benzthiazole, oxazole, benzoxazole, naphthathiazole, naphthoxazole, benzo-2,1,3-oxadiazole, pyrimidine or quinazoline wherein at least one nitrogen atom is in the N-oxide form.

The aforesaid compounds may be obtained by nitrating a heterocyclic nitrogen compound of which the nitrogen atom, or at least one of them if more than one is present, is in the form of an N-oxide.

Examples of typical compounds which may be made by this method (with literature references to their production) are as follows:

7-nitrobenzo-2:1:3-oxadiazole-1-oxide, Green and Rowe, J. Chem. Soc., 1913, 103, 2028.
5:7-dinitrobenzo-2:3-oxadiazole-1-oxide, Green and Rowe, J. Chem. Soc., 1913, 103, 2029.
2-methyl-4-nitropyridine-1-oxide, den Hertog, Rec. Trav. Chim., 1951, 70, 591.
4-nitropyridine-1-oxide, Ochiai et al., P. Pharm. Soc. Japan, 1943, 63, 280.
4-nitroquinoline-1-oxide, Ochiai et al., J. Pharm. Soc. Japan, 1943, 63, 280.

Alternatively, the compounds may be made by treatment of a nitro-heterocyclic compound with a peracid. Examples of typical compounds which may conveniently be made by this method are:

6-nitroquinoline-1-oxide, Bachmann and Cooper, J. Org. Chem., 1944, 9, 302–9.
5-nitroisoquinoline-2-oxide; by a similar process to give the product identical to that described by Ochiai and Ishikawa, J. Pharm. Soc. Japan, 1945, 65, 4A, 17.

In the production of direct positive emulsions according to the invention, the selected compound of the type defined is included in the silver chloride emulsion in an amount which is preferably from 0.1 to 2 gm. of the compound per 100 gms. of silver chloride. The emulsion may be pre-fogged by exposure to light, but it is preferred to pre-fog the emulsion chemically, for example by including formaldehyde in the emulsion and allowing the emulsion to stand at elevated temperature.

The following example will serve to illustrate the production of direct positive emulsions according to the invention:

Example 4.4 litres of a washed photographic emulsion containing 188 g. silver chloride and adjusted to a pH of 10 were treated with 12 ml. of a 4% solution of formaldehyde. After heating for 35 minutes at 52°, the emulsion was neutralised by addition of citric acid and cooled. There was then added 2 g. of 4-nitroquinoline N-oxide dissolved in 100 ml. of ethanol. The emulsion was coated on film base. On exposure and development the coated film yielded a direct positive image of high quality.

Similar results are obtained by the use of any others of the compounds listed above, used in similar quantity. However, the best results are obtained using 4-nitroquinoline N-oxide and 6-nitroquinoline N-oxide.

What I claim is:

1. A direct positive photographic element comprising a fogged gelatino silver chloride emulsion containing a desensitising compound which is a nitro derivative of a heterocyclic compound selected from the class consisting of pyridine, quinoline, isoquinoline, thiazole, benzthiazole, oxazole, benzoxazole, naphthathiazole, naphthoxazole, benzo-2,1,3-oxadiazole, pyrimidine and quinazoline, and wherein at least one hetero nitrogen atom is in the form of an N-oxide, the proportion of desensitising compound being 0.1 to 2 g. per 100 g. of silver chloride.

2. A direct positive photographic element according to claim 1 wherein the emulsion is chemically fogged.

3. A direct positive photographic element according to claim 1 wherein the emulsion is fogged by treatment with formaldehyde.

4. A direct positive photographic element according to claim 1 wherein the emulsion is fogged by light.

5. A direct positive photographic element comprising a fogged gelatino silver chloride emulsion containing a desensitising compound, wherein the desensitising compound is 7-nitrobenzo-2:1:3-oxadiazole-1-oxide.

6. A direct positive photographic element comprising a fogged gelatino silver chloride emulsion containing a desensitising compound, wherein the desensitising compound is 5:7-dinitrobenzo-2:3-oxadiazole-1-oxide.

7. A direct positive photographic element comprising a fogged gelatino silver chloride emulsion containing a desensitising compound, wherein the desensitising compound is 2-methyl-4-nitropyridine-1-oxide.

8. A direct positive photographic element comprising a fogged gelatino silver chloride emulsion containing a desensitising compound, wherein the desensitising compound is 4-nitropyridine-1-oxide.

9. A direct positive photographic element comprising a fogged gelatino silver chloride emulsion containing a desensitising compound, wherein the desensitising compound is 4-nitroquinoline-1-oxide.

10. A direct positive photographic element comprising a fogged gelatino silver chloride emulsion containing a desensitising compound, wherein the desensitising compound is 6-nitroquinoline-1-oxide.

11. A direct positive photographic element comprising a fogged gelatino silver chloride emulsion containing a desensitising compound, wherein the desensitising compound is 5-nitroisoquinoline-2-oxide.

References Cited in the file of this patent

UNITED STATES PATENTS

| | | |
|---|---|---|
| 2,293,261 | Kendall | Aug. 18, 1942 |
| 2,947,629 | Stewart et al. | Aug. 2, 1960 |